(12) United States Patent
Zha et al.

(10) Patent No.: US 9,880,611 B2
(45) Date of Patent: Jan. 30, 2018

(54) ENERGY SAVING MODE FOR ELECTRONIC DEVICES

(71) Applicant: GOOGLE INC., Mountain View, CA (US)

(72) Inventors: Tiantian Zha, Mountain View, CA (US); Albert Bodenhamer, San Jose, CA (US); Joshua Woodward, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 87 days.

(21) Appl. No.: 14/841,567

(22) Filed: Aug. 31, 2015

(65) Prior Publication Data

US 2017/0060225 A1 Mar. 2, 2017

(51) Int. Cl.
*G06F 1/00* (2006.01)
*G06F 1/32* (2006.01)

(52) U.S. Cl.
CPC .......... *G06F 1/3287* (2013.01); *G06F 1/3212* (2013.01); *G06F 1/3234* (2013.01); *G06F 1/3265* (2013.01); *G06F 1/3278* (2013.01); *G06F 1/3293* (2013.01); *Y02B 60/126* (2013.01); *Y02B 60/1242* (2013.01); *Y02B 60/1292* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 5,031,616 A | * | 7/1991 | Mann | A61N 1/36514 607/11 |
| 7,870,410 B2 | * | 1/2011 | Hyatt | G01R 31/3682 713/300 |
| 8,526,906 B1 | * | 9/2013 | Oroskar | H04W 52/0277 455/343.1 |
| 8,850,251 B1 | | 9/2014 | Maeng | |
| 8,996,897 B2 | * | 3/2015 | Nikam | G06F 1/3212 345/211 |
| 9,069,047 B2 | * | 6/2015 | Nallabelli | H02J 7/0047 |

(Continued)

OTHER PUBLICATIONS

International Search Report and Written Opinion from PCT/US2016/44100, dated Oct. 31, 2016, 10 pages.

*Primary Examiner* — Mohammed Rehman
(74) *Attorney, Agent, or Firm* — Brake Hughes Bellermann LLP

(57) ABSTRACT

A system and method for operating an electronic computing device that is capable of invoking a battery saver mode may monitor an amount of power remaining in a battery of the electronic computing device, and generate an alert when the remaining amount of power in the battery available for continued operation of the device is at or below a predetermined threshold. The alert may include a notification of the estimated power remaining and an option to enable the battery saver mode. The alert may include a notification of the estimated power remaining and that battery saver mode has been enabled, and an option to disable the battery saver mode. The alert may include a notification of the estimated power remaining, and an option to customize the parameters of the battery saver mode by adjusting operation of various features and applications of the device.

18 Claims, 6 Drawing Sheets

(56) References Cited

U.S. PATENT DOCUMENTS

| | | | |
|---|---|---|---|
| 2007/0011473 A1 | 1/2007 | Sung | |
| 2008/0141049 A1* | 6/2008 | Hassan | G06F 1/3203 |
| | | | 713/320 |
| 2008/0244289 A1* | 10/2008 | LeProwse | G06F 9/441 |
| | | | 713/320 |
| 2009/0243539 A1* | 10/2009 | Gangstoe | H04L 9/0662 |
| | | | 320/106 |
| 2012/0169608 A1 | 7/2012 | Forutanpour et al. | |
| 2012/0297215 A1* | 11/2012 | Saba | G06F 1/3203 |
| | | | 713/320 |
| 2012/0315960 A1 | 12/2012 | Kim | |
| 2013/0067255 A1* | 3/2013 | Nikam | G06F 1/3212 |
| | | | 713/320 |
| 2014/0001343 A1* | 1/2014 | Huh | A61F 9/067 |
| | | | 250/214 AL |
| 2014/0019873 A1* | 1/2014 | Gupta | G06F 9/4443 |
| | | | 715/744 |
| 2014/0029498 A1 | 1/2014 | Kim et al. | |
| 2014/0181550 A1* | 6/2014 | Tam | G06F 1/3206 |
| | | | 713/320 |
| 2015/0121112 A1* | 4/2015 | Wei | H04W 52/0264 |
| | | | 713/324 |

\* cited by examiner

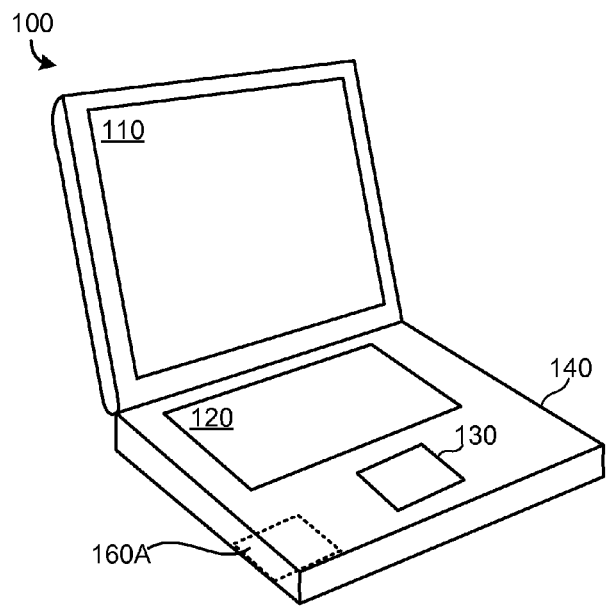
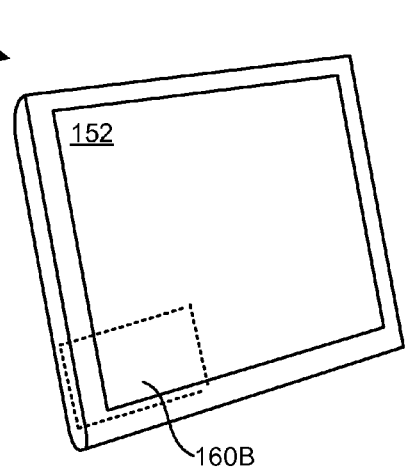
FIG. 1A  FIG. 1B
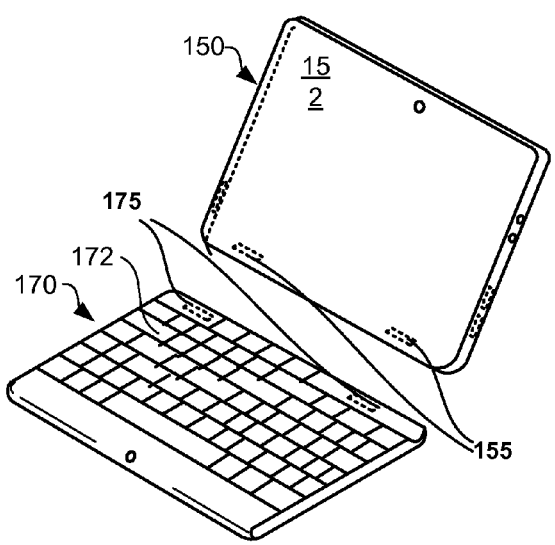
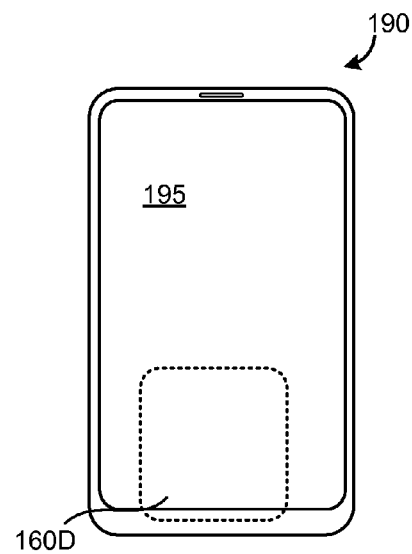
FIG. 1C  FIG. 1D

ENERGY SAVING MODE FOR ELECTRONIC DEVICES

FIELD

This document relates, generally, to electronic devices including a power storage device.

BACKGROUND

Electronic devices, in particular, portable electronic devices, may include a power storage device (e.g., a battery), that stores power for use by the electronic device when the electronic device is not connected to an external power source. Expanded capabilities of electronic devices may make use of these electronic devices more resource and power intensive, driving a need for additional stored battery power and/or an extension of the usable life of existing stored battery power.

SUMMARY

In one aspect, a method of operating an electronic computing device may include determining a current amount of energy available in a battery of an electronic device, comparing the determined current amount of energy to a threshold value, generating an alert when the determined current amount of energy is less than or equal to the threshold value, receiving an external input in response to the alert, and enabling a battery saver mode of the electronic device in response to the external input.

In another aspect, an electronic computing device may include a display, a battery, a memory storing executable instructions, and a processor configured to execute the instructions to cause the electronic device to determine a current amount of energy available in the battery, to compare the determined current amount of energy available in the battery to a threshold value, to display a visual alert on the display when the determined current amount of battery power is less than or equal to the threshold value, to receive an external input in response to the alert, and to enable a battery saver mode of the electronic computing device in response to receipt of the external input.

The details of one or more implementations are set forth in the accompanying drawings and the description below. Other features will be apparent from the description and drawings, and from the claims.

BRIEF DESCRIPTION OF THE DRAWINGS

FIGS. 1A-1D illustrate various exemplary electronic computing devices, in accordance with implementations as broadly described herein.

DETAILED DESCRIPTION

Figure 2:
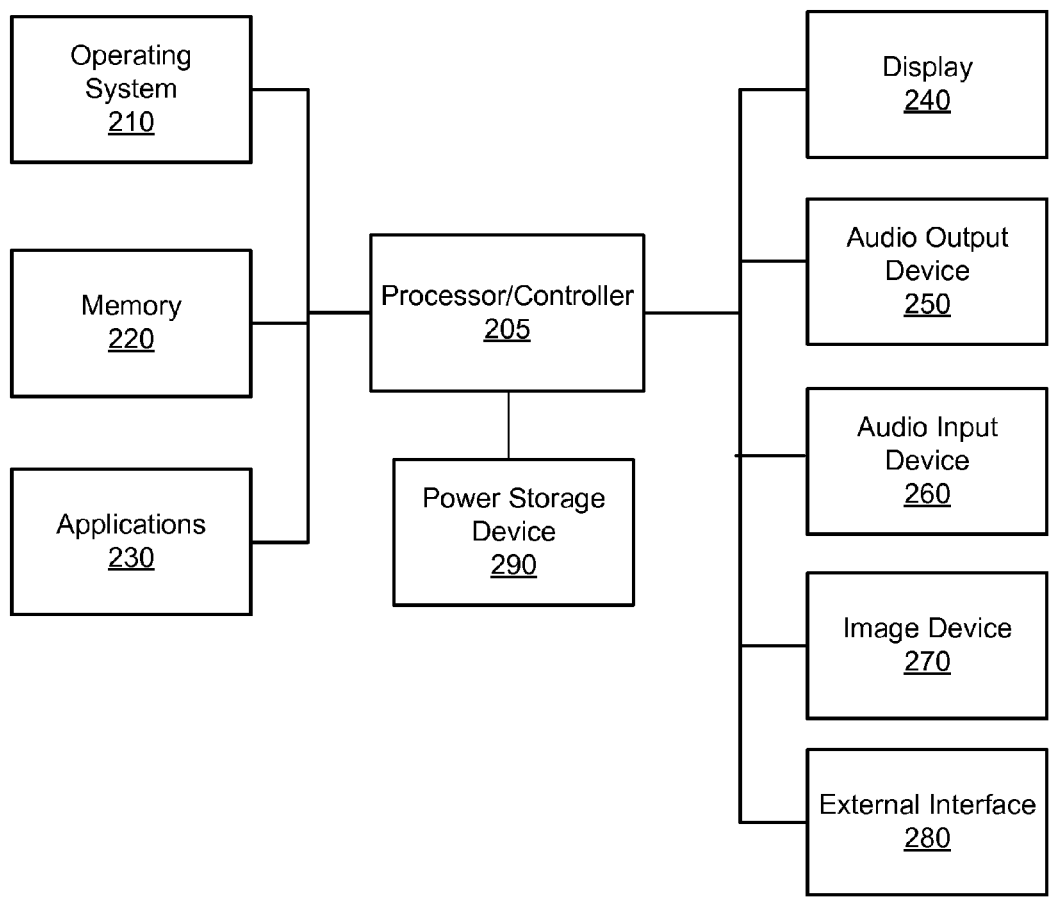
FIG. 2 is a block diagram of an exemplary electronic computing device, in accordance with implementations as broadly described herein.

Electronic computing devices, including, for example, laptop computers, notebook computers, tablet devices, smart phone devices, and other such devices, may operate on energy stored in a power storage device, such as, for example, a battery, when the electronic computing device is not connected to an external power source. Expanded use of these electronic devices to include accessing the internet through, for example, a wired or wireless connection, pairing and exchanging information with other electronic devices, simultaneous execution of numerous applications, and the like, may increase power consumption, thus decreasing usable operation time when not directly connected to the external power source, and adversely impacting usage and utility of the electronic device. Additional stored power may be made available by increasing battery size. However, increased battery size may also increase size, weight, cost and/or portability of the device. By extending the availability of existing stored power, or battery power, for example by implementing a battery saver mode in accordance with implementations as broadly described herein, may allow operating time of an electronic device on existing battery power to be extended, thus enhancing utility and functionality of the device.

Some electronic devices may implement a battery saver mode to achieve power savings during operation. This may involve, for example, an automatic implementation of the battery saver mode as soon as an amount of energy remaining in the battery is at or below a predetermined level. This automatic implementation of the battery saver mode, including, for example, disabling or limiting a certain set of features each time the battery saver mode is implemented, may extend a usage period while operating on the remaining energy stored in the battery. However, in some situations, the automatic implementation of the battery saver mode may be disruptive to a user's current operation of the electronic device. For example, in some situations, it may be beneficial for the user to have the ability to override the automatic implementation of the battery saver mode and/or make adjustments to features and/or functions which may otherwise be limited or disabled by the automatic implementation of the battery saver mode. For example, in some implementations, the automatic implementation of the battery saver mode may include disabling a flash associated with a camera of the electronic device. However, in some situations, the user may require that functionality of the flash remain enabled, based on current and short term projected use, such that automatically disabling the flash will degrade utility and functionality of the device to the user. Accordingly, in this situation, an indicator alerting the user of imminent implementation of the battery saver mode, and/or the ability to override the battery saver mode, and/or the ability to implement only certain features of the battery saver mode selected by the user, may enhance utility and functionality.

An electronic device implementing a battery saver mode, in accordance with implementations as broadly described herein, may achieve power savings during operation, and an increase in usable battery life, across essentially an entire operating system of a particular electronic device, when implementing an automatic process for conserving stored power based on a profile that may be customized in advance for a particular user, or customized real time, for user during a particular operating session. In some implementations, by providing alerts as energy stored in the battery is depleted, and providing options, for selection by the user, allowing the user to proceed with implementation of the battery saver mode, or override the battery saver mode, or customize the features affected by the battery saver mode for a particular session based on, for example, current intended use, or longer term, may further enhance utility to the user.

Various different types of exemplary computing devices are shown in FIGS. 1A-1D. For example, FIG. 1A illustrates a laptop computing device 100 including a display 110 coupled to a base 140, the base 140 including various input devices such as, for example, a keyboard 120, a touch sensitive pad 130 and the like. FIG. 1B illustrates a tablet computing device 150 configured without a keyboard, and with, for example, a touchscreen display 152 to provide an interface for user input. In some implementations, the tablet computing device 150 shown in FIG. 1B may be coupled with a base 170, or docking station 170, as shown in FIG. 1C, to provide for varied functionality, such as, for example, facilitating text entry using a keyboard 172, facilitating charging through connection between power port(s) 155, or terminal(s) 155 of the tablet computing device 150 and power port(s) 175, or terminal(s) 175, of the base 170, and the like. FIG. 1D illustrates a smart phone computing device 190 including, for example, a touchscreen display 195 to provide an interface for user input. Electronic devices, such as the exemplary computing devices 100, 150 and 190 shown in FIGS. 1A-1D, may include a power storage device, such as a battery 160A, 160B and 160D, respectively, storing power for use during operation when not connected to an external power source.

FIG. 2 is a block diagram of an example computing device that may implement a battery saver mode, in accordance with an implementation as described herein. In some implementations, the computing device 200 may include, for example, a processor/controller 205 invoking an operating system 210 and a memory 220 to run various applications 230. The computing device 200 may also include a display 240, an audio output device 250 including, for example, a speaker and/or a headphone port, an audio input device 260 including, for example, a microphone, an image device 270 capturing still and/or moving images such as, for example, a camera or webcam, an interface device 280 including, for example a communication port and/or interface port such as, for example, one or more USB ports, HDMI ports and the like, and other such components. The computing device 200 may also include a power storage device 290, or battery 290, In some implementations, a battery saver mode may be invoked in the example computing device 200. In some implementations, the battery saver mode may be invoked at a point at which a predetermined amount of battery power remains in the battery 290 (i.e., the energy stored in the battery 290 has been depleted to a predetermined point), so that a rate at which the remaining energy stored in the battery 290 is depleted may be reduced and an operation time of the device on the remaining energy stored in the battery may be increased.

For example, in some implementations, the computing device 200 may be configured to automatically invoke a standard battery saver mode when the available battery power is depleted to a predetermined level. This may include, for example, automatically dimming the display 240 of the device 200, automatically reducing an output level of the audio output device 250, limiting or disabling the capability of the image device 270 and/or the interface device 280, disabling features and/or execution of certain application(s) 230, and the like. This approach may extend the usable operation time of the device 200 on the remaining battery power. However, in certain circumstances, this may limit functionality and utility of the device 200.

In some implementations, the computing device 200 may be configured to issue an alert to the user when the available battery power reaches a predetermined threshold level, prior to invoking the battery saver mode. In some implementations, the predetermined threshold level at which a low battery alert may be issued may be a preset factory setting. In some implementations, the preset factory setting for the predetermined threshold level may be adjusted by a user. In some implementations, the predetermined threshold level at which a low battery alert may be issued may be set by a user based on user preferences. In some implementations, the predetermined threshold level at which a low battery alert is issued may be, for example, approximately 10% of battery capacity remaining. In some implementations, the predetermined threshold level at which a low battery alert is issued may be, for example, approximately 45 minutes of operating time. Other values may be appropriate, based on numerous different factors, including, for example, a particular implementation of the device, and/or a usage situation of the device, and/or user preferences.

As illustrated in the example implementation shown in FIGS. 3A-3C, the device 200 may display a visual alert 245 on the display 240 of the device 200, in response to a determination by the device that remaining battery power is at or below a predetermined level. For example, in some implementations, the predetermined level may be a point at which a predetermined percentage X of the total capacity of the battery 290 remains available for continued operation, and/or a predetermined amount of estimated operation time remains based on the remaining battery power and current usage. In some implementations, in addition to, or instead of, a visual alert, the device 200 may issue an audible alert, a tactile alert such as a vibration, or other alert which may alert the user to the state of the battery 290.

Figure 3A:
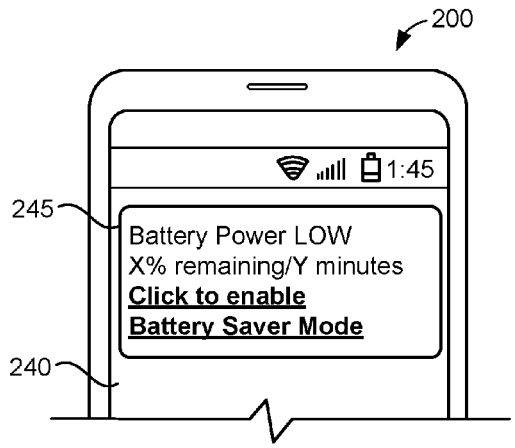
FIGS. 3A-3C illustrate options in enabling a battery saver mode of an electronic computing device, in accordance with implementations as broadly described herein.

As shown in FIG. 3A, in some implementations, the visual alert 245 may include an indication that battery power is low, and a remaining amount X of battery power and/or estimated remaining operation time Y. The alert 245 may also include a link for the user to enable the battery saver mode. In the example shown in FIG. 3A, clicking the link to enable the battery saver mode may enable a battery saver mode including a previously set, or previously selected, set of features and/or actions to be taken. In some implementations, this set of features and/or action to be taken when invoking the battery saver mode may be a standard, preset factory setting. In some implementations, this set of features and/or actions to be taken when invoking the battery saver mode may be selected by the user, and stored in a user profile, for example, in the memory 220 of the computing device 220 for access by the controller 205 upon selection of the battery saver mode.

In some implementations, features and/or actions to be taken when invoking the battery saver mode may include one or more of, for example, dimming the display 240, decreasing a volume output by the audio output device 250, reducing and/or eliminating functionality of the image device 270, such as, for example, disabling a flash or zoom function of a camera of the image device 270, disabling radio communication (for example, Bluetooth and/or WiFi), disabling data communication, disabling or limiting location services, disabling background synching and/or polling and/or limiting or changing an interval of background synching and/or polling, disabling or limiting interface with peripheral devices and/or charging of other devices via the external interface 280, decreasing resolution of images displayed on the display 240, putting the device 200 in a sleep mode more quickly after a set period of inactivity, and the like. In some implementations, the features and/or actions to be taken when invoking the battery saver mode may also include making adjustments in the application(s) 230 running on the computing device 200, and particularly applications which are not in regular use and may be running in the background but not critical to the user's current usage.

Figure 3B:
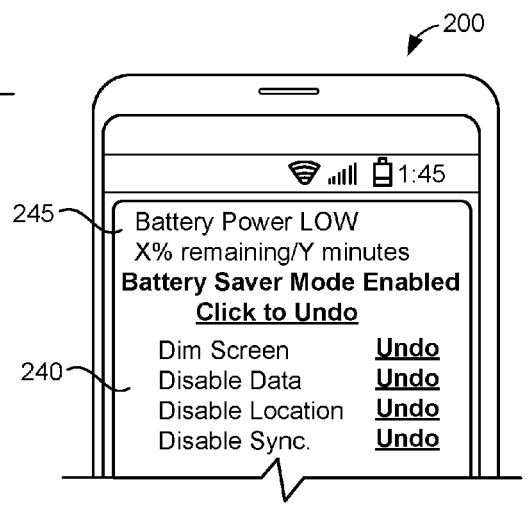

As shown in FIG. 3B, in some implementations, the visual alert 245 may include an indication that battery power is low, and a remaining amount X of battery power and/or estimated remaining operation time Y. The alert 245 may also indicate that the battery saver mode, for example, the standard, preset battery saver mode or a user specific battery saver mode as discussed above, has already been enabled based on the depleted battery power level, and may include a link for the user to disable, or undo, the battery saver mode. In some implementations, the alert 245 shown in FIG. 245 may also provide an indication of which features and/or applications may be affected by enabling the battery saver mode, and may include a link for the user to disable, or undo, individual adjustments or changes which would be otherwise automatically be made by enabling the battery saver mode, as shown in FIG. 3B. In the example shown in FIG. 3B, clicking the link to disable, or undo, the battery saver mode (or disable, or undo, individual operating features associated with the battery saver mode) may allow a user to continue to use the computing device 200 in a desired manner, with the knowledge that power stored in the battery 290 and available for continued use has been depleted to a predetermined level. In some implementations, the user may choose to continue to operate the computing device 200 and adjust usage based on the depleted battery power level, connect the computing device 200 to an external power source for charging, and the like.

Figure 3C:
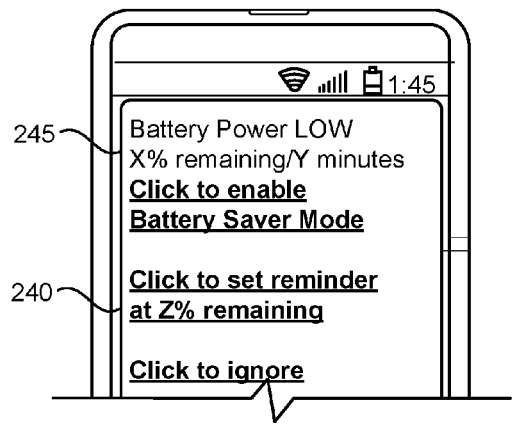

As shown in FIG. 3C, in some implementations, the visual alert 245 may include an indication that battery power is low, and a remaining amount X of battery power and/or estimated remaining operation time Y. This first alert 245 may also include a first link for the user to enable the battery saver mode. Clicking the link to enable the battery saver mode may be the standard, preset battery saver mode or a user specific battery saver mode as discussed above.

As shown in FIG. 3C, in some implementations, the first alert 245 may also include a second link requesting another alert 245 be issued when the battery power is further depleted to a predetermined level Z. In some implementations, selection of the second link requesting a second alert 245 at Z% battery power remaining may also cause the battery saver mode to be enabled, including the standard, preset battery saver mode or the user specific battery saver mode as discussed above. In some implementations, selection of the second link requesting the second alert 245 at Z% battery power remaining may cause the computing device 200 to continue in a current mode of operation, without invoking the battery saver mode. In some implementations, the second alert 245 at Z% battery power remaining may also include a link allowing the user to select or decline the battery saver mode.

As shown in FIG. 3C, in some implementations, the first alert 245 may also include a third link. Selection of the third link may allow the user to simply ignore the alert and continue operation of the computing device 200. In some implementations, no other alerts will be issued in response to selection of the third link to ignore the current alert 245. In some implementations, selection of the third link to ignore the current alert 245 may cause another alert to be issued at a predetermined interval.

Figure 4:
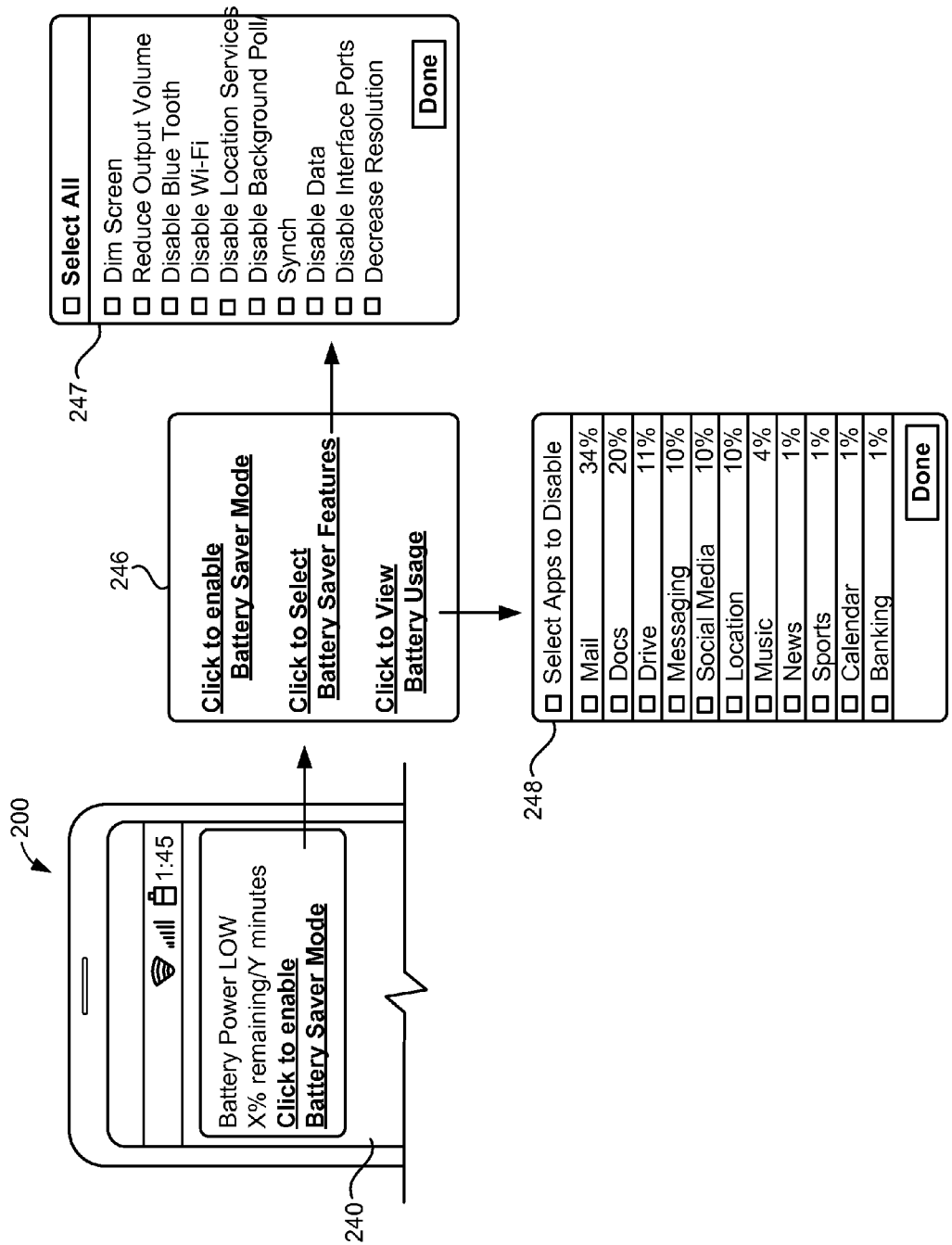
FIG. 4 illustrates options in enabling a battery saver mode of an electronic computing device, in accordance with implementations as broadly described herein.

As shown in FIG. 4, in some implementations, the computing device 200 may generate a first screen including a visual alert 245, including an indication that battery power is low, and a remaining amount X of battery power and/or estimated remaining operation time Y. The alert 245 on the first screen may also include a link for the user to enable the battery saver mode. In the example shown in FIG. 4, selection of the link to enable the battery saver mode may cause a second screen 246 to be displayed, the second screen 246 including first, second and third links. Selection of the first link on the second screen 246 may enable the battery saver mode, for example, the standard, preset battery saver mode or a user specific battery saver mode as discussed above, without further user interaction.

Selection of the second link on the second screen 246 may cause a third screen 247 to be displayed, the third screen 247 including various features of the computing device 200 which may be adjusted and/or disabled in order to conserve remaining battery power and extend operation time of the computing device 200 using the remaining battery power. In some implementations, these features may include, for example, dimming the display 240, decreasing a volume output by the audio output device 250, reducing and/or eliminating functionality of the image device 270, disabling radio communication (for example, Bluetooth and/or WiFi), disabling data communication, disabling or limiting location services, disabling background synching and/or polling and/or limiting or changing an interval of background synching and/or polling, disabling or limiting interface with peripheral devices and/or charging of other devices via the external interface 280, decreasing resolution of images displayed on the display 240, putting the device 200 in a sleep mode more quickly after a set period of inactivity, and the like. After selection of some, or none, or all, of the features shown on the third screen 247, the user may update the battery saver mode to reflect the features selected from the third screen 247 by clicking "Done," and return to the second screen 246.

Selection of the third link on the second screen 246 may cause a fourth screen 248 to be displayed, the fourth screen 248 including various applications 240 running on the computing device 200. In some implementations, the fourth screen 248 may also provide an indication of a share, for example, a percentage, of the battery power that has been consumed by each of the applications. In some implementations, this share, or percentage of battery power that has been consumed by each of the applications may be measured for example, in a period of operation since the last charging session, or since the computing device 200 was last connected to an external power source. This information may provide an indication to the user of which of the applications running on the computing device 200 consume the most power, and may assist the user in selecting application(s) to adjust or disable when conserving battery power in a particular session. After selection of some, or none, or all, of the applications shown on the fourth screen 248, the user may update the battery saver mode to reflect the application(s) selected from the fourth screen 248 by clicking "Done," and return to the second screen 246.

In some implementations, the battery saver mode may be enabled by the user by clicking the first link on the second screen 246 as soon as the first screen 246 is displayed, as discussed above. In some implementations, the battery saver mode may be enabled by the user by clicking the first link on the second screen 246 after selecting feature(s) from the third screen 247 and returning to the second screen 246, the enabled battery saver mode including the feature(s) selected from the third screen 247. In some implementations, the battery saver mode may be enabled by the user by clicking the first link on the second screen 246 after selecting application(s) from the fourth screen 248 and returning to the second screen 246, the enabled battery saver mode including the application(s) selected from the fourth screen 248. In some implementations, the battery saver mode may be enabled by the user by clicking the first link on the second screen 246 after selecting feature(s) from the third screen 247 and application(s) from the fourth screen 248 and returning to the second screen 246, the enabled battery saver mode including the feature(s) selected from the third screen 247 and the application(s) selected from the fourth screen 248.

In the example discussed herein with respect to FIG. 4, feature(s) are selected from the third screen 247 and then application(s) are selected from the fourth screen 248. However, application(s) may be selected from the fourth screen 248 and then feature(s) may be selected from the third screen 247. Further, feature(s) may be selected from the third screen 247, with no application(s) selected from the fourth screen 248, to be included in the battery saver mode; or application(s) may be selected from the fourth screen 248, with no feature(s) selected from the third screen 247, to be included in the battery saver mode; or feature(s) may be selected from the third screen 247 and application(s) may also selected from the fourth screen 248 to be included in the battery saver mode.

The battery saver mode discussed above with respect to FIGS. 3A-3C and 4 may allow a user to manage battery power essentially real time, based on a current status of the battery 290 and current usage of the computing device 200. That is, a standard battery saver mode, in which a standard set of features are adjusted or disabled, and/or in which a standard set of applications are limited or disabled, for each session and each user. A battery saver mode, as embodied and broadly described herein, may allow the user to specifically enable or disable the battery saver mode, and/or fine tune the battery saver mode to current usage conditions. For example, in response to an alert indicating low battery power, a user may choose to disable, or not enable, the battery saver mode if the computing device 200 will soon be connected to an external power source, or if current usage requires full functionality of some or all features which would otherwise be affected by enabling the battery saver mode. Similarly, in response to an alert indicating low battery power, a user may choose to tailor the feature(s) and/or applications affected by the battery saver mode based on current usage. For example, if the image device is currently in use for capturing images, the user may choose to keep settings associated with the display 240 and the image device 270 (including, for example, a flash) unchanged, while adjusting other feature(s) and/or application(s) which may not affect the quality of the images captured.

Figure 5:
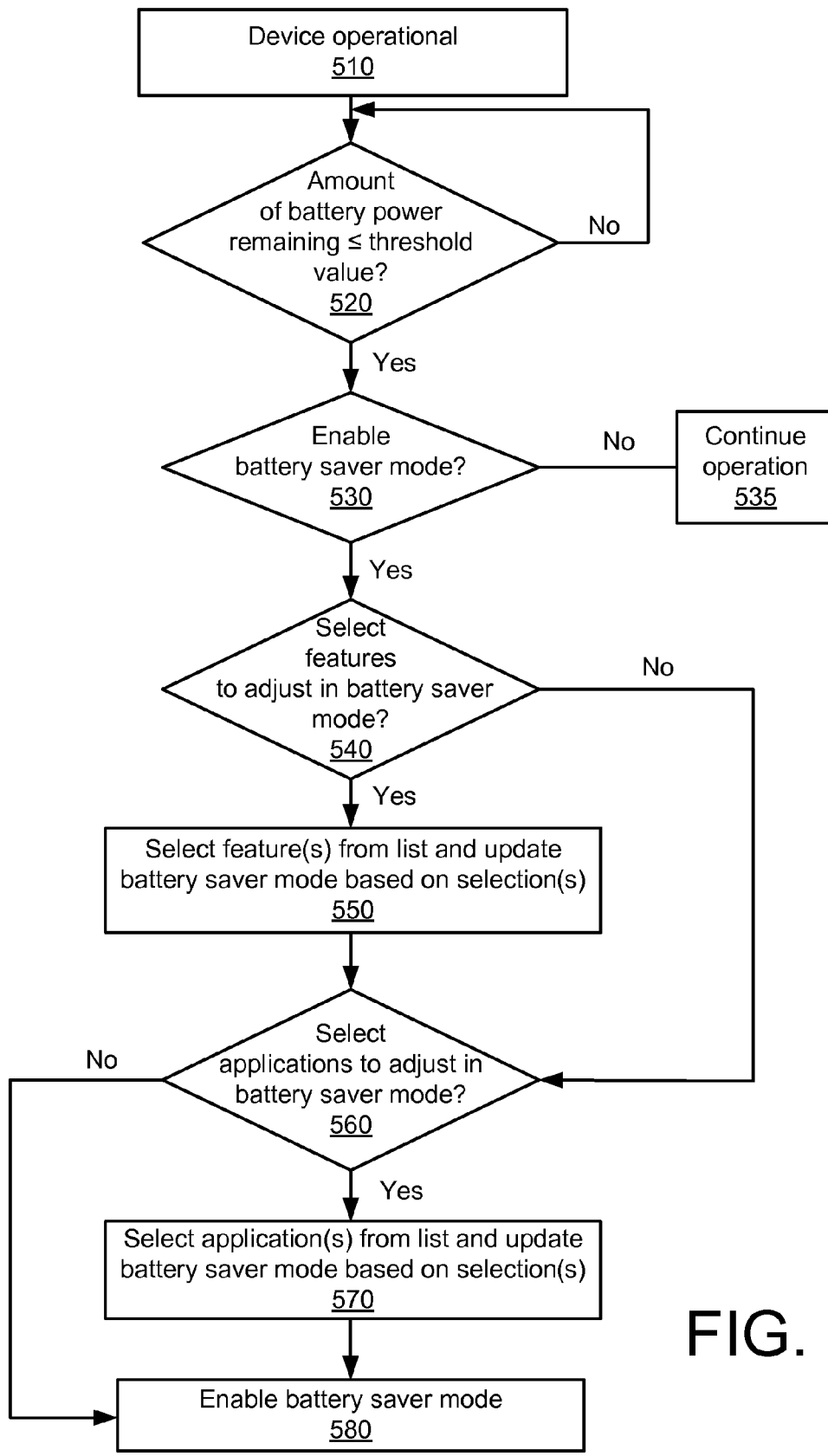
FIG. 5 is a flowchart of a method of operating an electronic computing device including a battery saver mode, in accordance with implementations as broadly described herein.

FIG. 5 is a flowchart of an exemplary method of operating an electronic computing device, such as, for example, one of the electronic computing devices 100, 150, 190 shown in FIGS. 1A-1D and/or the electronic computing device 200 shown in FIG. 2, configured to invoke a battery saver mode, in accordance with implementations as described herein.

As shown in FIG. 5, when the device is operational, at block 510, the device may automatically monitor an amount of available power remaining in the battery. When it is determined, for example, by a controller of the device, that the amount of available power remaining in the battery is less than or equal to a preset threshold, at block 520, the device may generate an alert, for example, as shown in FIGS. 3A-3C and 4, indicating that the amount of battery power remaining is less than or equal to the preset threshold and providing for a selection as to whether or not battery saver mode is to be enabled. If, at block 530, it is determined, for example, through user input, that battery saver mode is not to be enabled, the device may continue operation, at block 535.

If, at block 530, it is determined, for example, through user input, that battery saver mode is to be enabled, it is then determined, at block 540, whether or not specific features, such as, for example, features similar to those discussed above with respect to the third screen 247 shown in FIG. 4, are to be individually selected for adjustment in customizing the battery saver mode to, for example, a current state of use of the device, a specific user of the device and the like. If it is determined, at block 540, that specific features are to be selected for adjustment (for example, functionality limited or disabled), features to be adjusted may be selected from a list of features available for adjustment in the device, and parameters of the battery saver mode may be updated to reflect the selected features, at block 550.

It may be determined, at block 560, for example, through user input, whether or not specific applications, such as, for example, applications similar to those discussed above with respect to the fourth screen 248 shown in FIG. 4, are to be individually selected for adjustment in customizing the battery saver mode to, for example, a current state of use of the device, a specific user of the device and the like. If it is determined, at block 560, that specific applications are to be selected for adjustment (for example, functionality limited or disabled), applications to be adjusted may be selected from a list of applications available for adjustment in the device, and parameters of the battery saver mode may be updated to reflect the selected applications, at block 570. The battery saver mode, including any updates to the battery saver mode based on adjustments to selected features and/or applications, may then be enabled, at block 580.

Figure 6:
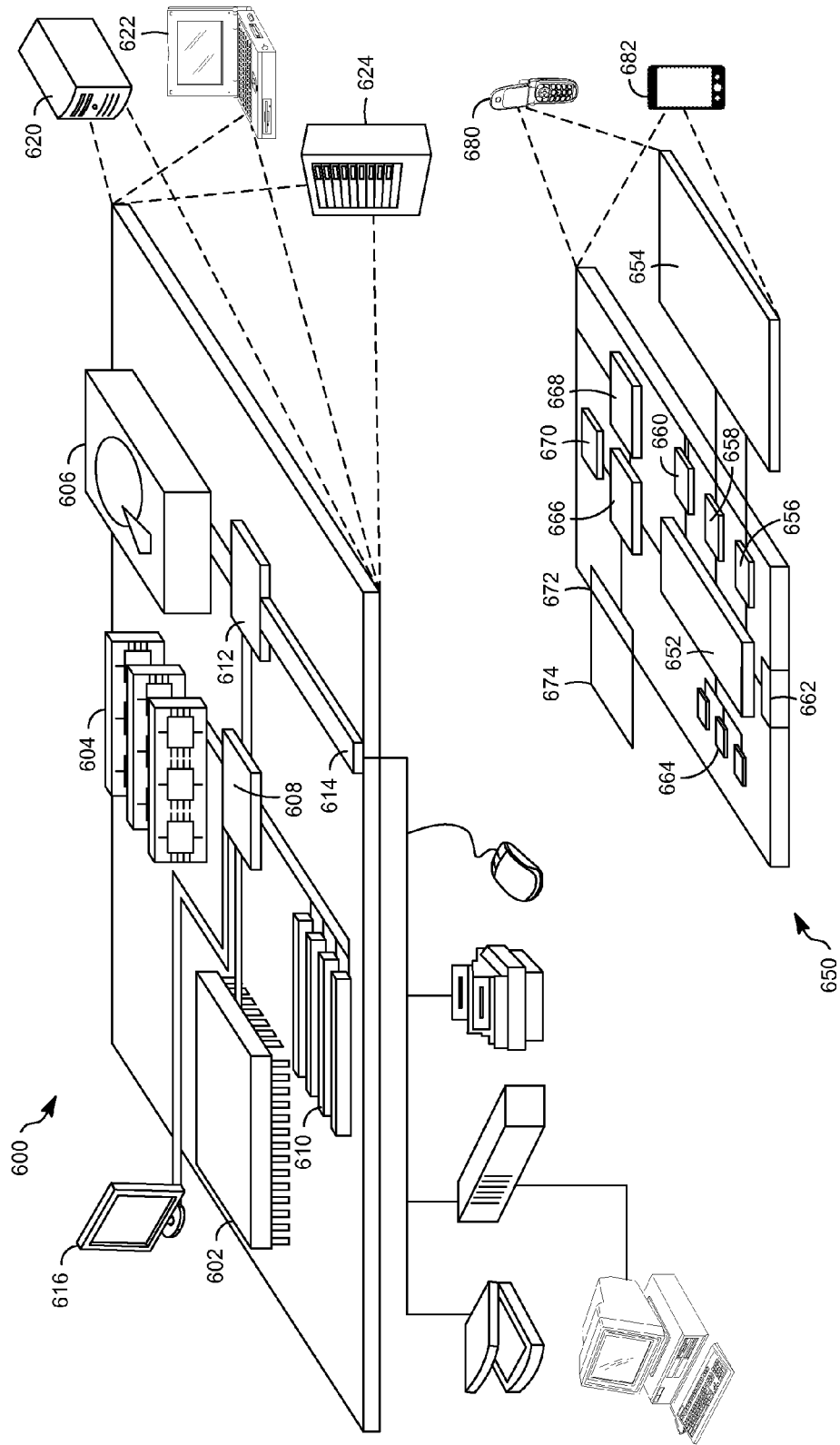
FIG. 6 illustrates an example of a computing device and a mobile computing device that can be used to implement the techniques described herein.

FIG. 6 shows an example of a generic computing device 600 and a generic mobile computing device 680, similar to the computing devices 100, 150 and 190 shown in FIGS. 1A-1D, respectively, illustrating some of the components of the respective computing devices. Computing device 600 is intended to represent various forms of digital computers, such as laptop computers, convertible computers, tablet computers, desktop computers, workstations, personal digital assistants, servers, blade servers, mainframes, and other appropriate computers. Computing device 680 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 800, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 680. Each of such devices may contain one or more of computing device 600, 680, and an entire system may be made up of multiple computing devices 600, 680 communicating with each other.

Computing device 680 includes a processor 682, memory 664, and an input/output device such as a display 684, a communication interface 666, and a transceiver 668, among other components. The device 680 may also be provided with a storage device, such as a microdrive or other device, to provide additional storage. Each of the components 680, 682, 664, 684, 666, and 668, are interconnected using various buses, and several of the components may be mounted on a common motherboard or in other manners as appropriate.

The processor 682 can execute instructions within the computing device 680, including instructions stored in the memory 664. The processor may be implemented as a chipset of chips that include separate and multiple analog and digital processors. The processor may provide, for example, for coordination of the other components of the device 680, such as control of user interfaces, applications run by device 680, and wireless communication by device 680.

Processor 682 may communicate with a user through control interface 688 and display interface 686 coupled to a display 684. The display 684 may be, for example, a TFT LCD (Thin-Film-Transistor Liquid Crystal Display) or an OLED (Organic Light Emitting Diode) display, or other appropriate display technology. The display interface 686 may comprise appropriate circuitry for driving the display 684 to present graphical and other information to a user. The control interface 688 may receive commands from a user and convert them for submission to the processor 682. For example, the control interface 688 may receive in input entered by a user via, for example, the keyboard 680, and transmit the input to the processor 682 for processing, such as, for entry of corresponding text into a displayed text box. In addition, an external interface 662 may be provide in communication with processor 682, so as to enable near area communication of device 680 with other devices. External interface 662 may provide, for example, for wired communication in some implementations, or for wireless communication in other implementations, and multiple interfaces may also be used.

The memory 664 stores information within the computing device 680. The memory 864 can be implemented as one or more of a computer-readable medium or media, a volatile memory unit or units, or a non-volatile memory unit or units. Expansion memory 674 may also be provided and connected to device 880 through expansion interface 672, which may include, for example, a SIMM (Single In Line Memory Module) card interface. Such expansion memory 674 may provide extra storage space for device 680, or may also store applications or other information for device 680. Specifically, expansion memory 674 may include instructions to carry out or supplement the processes described above, and may include secure information also. Thus, for example, expansion memory 674 may be provide as a security module for device 880, and may be programmed with instructions that permit secure use of device 880. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 874, or memory on processor 682, that may be received, for example, over transceiver 668 or external interface 662.

Device 680 may communicate wirelessly through communication interface 666, which may include digital signal processing circuitry where necessary. Communication interface 66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 680, which may be used as appropriate by applications running on device 680.

Device 680 may also communicate audibly using audio codec 660, which may receive spoken information from a user and convert it to usable digital information. Audio codec 660 may likewise generate audible sound for a user, such as through a speaker, e.g., in a handset of device 680. Such sound may include sound from voice telephone calls, may include recorded sound (e.g., voice messages, music files, etc.) and may also include sound generated by applications operating on device 680.

The computing device 680 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   determining a current amount of energy available in a battery of an electronic device;
   comparing the determined current amount of energy to a threshold value;
   displaying a visual alert on a display of the electronic device in response to a determination that the current amount of energy is less than or equal to the threshold value; and
   controlling a battery saver mode of the electronic device based on an input received in response to the visual alert, the controlling including:
      disabling the battery saver mode in response to a first external input to the electronic device, the first external input including a first user input selecting a first mode in response to the visual alert; and
      enabling the battery saver mode in response to a second external input to the electronic device, the second external input including a second user input selecting a second mode in response to the visual alert, the second external input including at least one user selection from the visual alert of an operating feature of the electronic device to be modified, wherein enabling the battery saver mode includes:
         modifying at least one current operating parameter of the electronic device from the visual alert in response to the second external input; and
         operating the electronic device in the battery saver mode in accordance with the at least one modified operating parameter.

2. The method of claim 1, wherein enabling the battery saver mode comprises enabling the battery saver mode only in response to the second external input.

3. The method of claim 1, wherein modifying the at least one current operating parameter of the electronic device from the visual alert in response to the second external input includes at least one of dimming a display of the electronic device, reducing an output level of an audio output device of the electronic device, disabling or limiting operation of radio connection devices of the electronic device, disabling or limiting data exchange with external devices, disabling a location service of the electronic device, or disabling connection with external devices via one or more interface ports of the electronic device.

4. The method of claim 3, wherein modifying the at least one current operating parameter of the electronic device from the visual alert in response to the second external input includes adjusting operation of at least one application of a plurality of applications available on the electronic device.

5. The method of claim 4, wherein adjusting operation of at least one application of a plurality of applications available on the electronic device includes disabling at least one application of the plurality of applications available on the electronic device, or limiting operational functionality of at least one application of the plurality of applications available on the electronic device.

6. The method of claim 1, wherein displaying the visual alert on the display of the electronic device includes displaying at least one of the current amount of energy available in the battery or an estimated amount of operating time remaining based on the current amount of energy available in the battery.

7. The method of claim 6, wherein displaying the visual alert on the display of the electronic device includes displaying a first selection screen including a first link enabling the battery saver mode and a second link disabling the battery saver mode.

8. The method of claim 7, wherein displaying the visual alert on the display of the electronic device includes displaying a second selection screen in response enabling the battery saver mode at the first selection screen, the second selection screen providing for selection of operating features from a plurality of operating features of the electronic device, and providing for selection of applications from a plurality of applications available on the electronic device.

9. The method of claim 8, wherein displaying the visual alert on the display of the electronic device includes displaying a third selection screen listing the plurality of operating features of the electronic device, the method further comprising:
   receiving a selection of operating features from the plurality of operating features displayed on the third screen, operation of the selected features to be disabled or adjusted when the battery saver mode is enabled; and
   modifying operating parameters of the electronic device in the battery saver mode based on the selected operating features.

10. The method of claim 9, wherein displaying the visual alert on the display of the electronic device includes displaying a fourth selection screen listing the plurality of applications available on the electronic device, the method further comprising:
    receiving a selection of applications from the plurality of applications displayed on the fourth selection screen, operation of the selected applications to be disabled or adjusted when the battery saver mode is enabled; and
    modifying operating parameters of the electronic device in the battery saver mode based on the selected applications.

11. The method of claim 10, wherein enabling the battery saver mode in response to a second external input includes enabling the battery saver mode implementing the modified operating parameters based on the operating features selected from the third selection screen and the applications selected from the fourth selection screen.

12. The method of claim 6, wherein displaying the visual alert on the display of the electronic device includes:
    displaying one or more operating features of the electronic device to be disabled or adjusted according to current operating parameters of the battery saver mode; and
    displaying one or more applications to be disabled or adjusted according to current operating parameters of the battery saver mode.

13. The method of claim 12, wherein displaying the visual alert on the display of the electronic device further includes:
    displaying an option to undo the disabling or adjustment of the one or more operating features before the battery saver mode is enabled; and
    displaying an option to undo the disabling or adjustment of the one or more applications before the battery saver mode is enabled.

14. The method of claim 13, wherein enabling the battery saver mode of the electronic device in response to a second external input includes:

modifying the operating parameters of the battery saver mode based on selections of the option to undo the disabling or adjustment of the one or more operating features, and on selections of the option to undo the disabling or adjustment of the one or more applications; and enabling the battery saver mode implementing the modified operating parameters for the electronic device.

15. An electronic computing device, including:
a display;
a battery;
a memory storing executable instructions; and
a processor configured to execute the instructions to cause the electronic device to:
  determine a current amount of energy available in the battery;
  compare the determined current amount of energy available in the battery to a threshold value;
  display a visual alert on the display in response to a determination that a current amount of battery power is less than or equal to the threshold value; and
  control a battery saver mode of the electronic computing device based on an input received in response to the visual alert, including:
    disable the battery saver mode in response to a first external input to the electronic device, the first external input including a first user input selecting a first mode in response to the visual alert; and
    enable the battery saver mode in response to a second external input to the electronic device, the second external input including a second user input selecting a second mode in response to the visual alert, the second external input including at least one user selection from the visual alert of an operating feature of the electronic device to be modified, enable the battery saver mode, including:
      modify at least one current operating parameter of the electronic device from the visual alert in response to the second external input; and
      operate the electronic device in the battery saver mode in accordance with the at least one modified operating parameter.

16. The device of claim 15, wherein, in the battery saver mode of the electronic computing device, at least one operating feature of the electronic device or at least one application available on the electronic computing device is disabled or adjusted.

17. The device of claim 16, wherein the processor is further configured to execute the instructions to cause the electronic device to receive the second external input, and to modify operating parameters of the electronic device from the visual alert in response to the second external input before enabling the battery saver mode, the second external input including user selection of one or more operating features of the plurality of operating features of the electronic computing device, and user selection of one or more applications of the plurality of applications available on the electronic computing device.

18. The device of claim 17, wherein the plurality of operating features of the electronic computing device to be disabled or adjusted in the battery saver mode includes at least dimming a display of the electronic device, reducing an output level of an audio output device of the electronic device, disabling or limiting operation of radio connection devices of the electronic device, disabling or limiting data exchange with external devices, disabling a location service of the electronic device, or disabling connection with external devices via one or more interface ports of the electronic device.

* * * * *